Patented Sept. 26, 1922.

1,430,365

UNITED STATES PATENT OFFICE.

GEORGE S. FINNEY, OF CHICAGO, ILLINOIS, ASSIGNOR OF ONE-HALF TO BYRON D. ADSIT, OF CHICAGO, ILLINOIS.

COMPOSITE-SHEET BODY.

No Drawing.     Application filed May 21, 1921. Serial No. 471,435.

*To all whom it may concern:*

Be it known that I, GEORGE S. FINNEY, a citizen of the United States, residing at Chicago, in the county of Cook and State of Illinois, have invented certain new and useful Improvements in a Composite-Sheet Body, of which the following is a specification.

My invention relates to the surfacing of plastic bodies with granular material for the purpose of increasing the durability of said bodies or for giving the same an attractive appearance, or for other analogous purposes. One of the principal objects of the invention is to provide an improved material in the form of shingles or sheets, for roofing or analogous uses, surfaced with or having embedded in the plastic stratum thereof an artificial granulated material of fused or vitreous character which is hard, dense, impervious to moisture and capable of being readily manufactured in a great variety of colors. It is customary to make a roofing sheet or shingle of a layer of asphalt or other plastic material backed by a felt, or other fabric backing, and surfaced with granulated slate which is more or less adherent to the asphalt stratum. A roof sheet so made lacks durability. The slate is soft so that it cannot be forced into the plastic stratum sufficiently to insure a permanent bond. Moreover, water, and especially frost, tends to disintegrate the slate which then is liable to be washed off so as to expose the asphalt. The surfacing which I propose to use consists of an artificial vitreous, non-absorbent product made by fusing together mineral substances, one or more of which are vitrifiable, which are thereafter granulated and may be pressed into the plastic stratum to whatever extent is necessary to insure a permanent bond between the granules and the asphalt or other plastic substance, the granules being hard and dense enough to withstand such pressure without being crushed or pulverized. In fact the granulated material may be so completely incorporated with the plastic substance by passing the sheets through rolls, for example, that the plastic substance becomes merely a binder for the granular material, the latter, in such case, forming the body of the sheet. It will be understood that in referring to the granular material as a surfacing material I do not intend to exclude the more complete incorporation of such material with the plastic substance just suggested. When the roof sheet or shingle is surfaced with a granular vitreous material produced as contemplated by my invention, the density, hardness and imperviousness of such material to liquids gives the article a durability which far exceeds the durability of the ordinary roofing material. Moreover, by proper choice of raw materials in the manufacture of the vitreous product it may be given almost any color that may be desired.

To give examples of vitreous substances contemplated by my invention and their method of manufacture, I may mix lime stone and sand, preferably in about equal proportions (the sand may carry some clay, which is optional) and charge the mixture with coke or charcoal into a furnace adapted to that purpose, where the ingredients are fused into a vitreous mass which after being withdrawn from the furnace and allowed to cool, is granulated to any desired degree of fineness by means of a stone crusher, or the like. With the ingredients mixed in proper proportions, as stated, and heated to fusion, the resultant product will be a vitreous, non-absorbent calcium silicate, containing an excess of silica, differing, therefore, from blast furnace slags which contain an excess of lime and will consequently absorb liquids such as water. Instead of using this composition I may mix copper, lead or iron slag with silica or other vitrifiable substances and fuse and thereafter granulate as above stated. The added silica combines in this case with the free lime in the slag so as to make it possible to vitrify the material. The proper admixture of slags will give characteristic colors to the products, or any other mineral coloring ingredients may be employed. By selection of ingredients it is possible to obtain a very wide range of colors in the product. Because of the non-absorbent character of the material its color will not be affected by contact with liquids.

After the material has been granulated it may be spread upon the asphalt stratum of the sheet or shingle and, if desired, pressed into such plastic stratum by passing the sheet or shingle between rolls, or by any other method. The pressure may be merely sufficient to partially embed the granules in the plastic substance or may be great enough so that there will be a complete incorporation of the granular material with the plastic material, the latter becoming, in effect, merely a binder for the former. A roof shingle made in this manner, because of the dense, non-absorbent character of the granular particles forming its surface, will last much longer than the ordinary roofing materials now in common use. If the surfacing substance in roofing is absorbent, it will disintegrate under the action of moisture and temperature changes. The particles are cracked by the frost and in some cases frost in the surfacing material will cause the buckling of the shingle. This is objectionable in itself, and moreover loosens the bond between the particles and the plastic stratum.

The granular material manufactured as above described may also be used as a surfacing material for cement or concrete for building purposes. When used in this connection the material has the advantage of not washing off and may be produced in almost any desired color.

I claim:

1. A composite sheet body for roofing, or like purposes, comprising a plastic stratum and an adherent surfacing for the same consisting of a granulated fused non-absorbent, vitreous composition of mineral substances.

2. A composite sheet body for roofing, or like purposes, comprising a plastic stratum and embedded therein, a granular material consisting of a fused composition of slag and silica.

3. A plastic body having incorporated into the superficial portion of the same, in a granular state, a substance consisting of a fused non-absorbent, vitreous composition of lime and silica.

GEORGE S. FINNEY.